United States Patent
Cheung et al.

(10) Patent No.: US 9,009,767 B2
(45) Date of Patent: *Apr. 14, 2015

(54) PROCESS AND METHOD OF PROVIDING A SHARED EXPERIENCE WITH MULTIMEDIA CONTENT

(71) Applicant: AT&T Intellectual Property II, L.P., Atlanta, GA (US)

(72) Inventors: Eric Cheung, New York, NY (US); Gerald Karam, Morristown, NJ (US); Kermit Hal Purdy, Bernardsville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,986

(22) Filed: May 22, 2014

(65) Prior Publication Data

US 2014/0258411 A1  Sep. 11, 2014

Related U.S. Application Data

(63) Continuation of application No. 11/685,509, filed on Mar. 13, 2007, now Pat. No. 8,739,234.

(51) Int. Cl.

| | |
|---|---|
| *H04N 7/16* | (2011.01) |
| *H04L 29/06* | (2006.01) |
| *H04N 21/63* | (2011.01) |
| *H04N 21/258* | (2011.01) |
| *H04L 29/08* | (2006.01) |
| *H04N 21/433* | (2011.01) |
| *H04N 21/462* | (2011.01) |
| *H04N 21/475* | (2011.01) |

(Continued)

(52) U.S. Cl.
CPC ............ *H04L 65/403* (2013.01); *H04N 21/632* (2013.01); *H04N 21/25841* (2013.01); *H04L 29/08306* (2013.01); *H04L 29/08351* (2013.01); *H04L 65/00* (2013.01); *H04N 21/4334* (2013.01); *H04N 21/4622* (2013.01); *H04N 21/4758* (2013.01); *H04N 21/4788* (2013.01); *H04L 65/1089* (2013.01); *H04N 5/765* (2013.01); *H04H 60/27* (2013.01)

(58) Field of Classification Search
CPC ............ H04N 21/242; H04N 21/4307; H04N 21/42204; H04N 21/4302; H04N 21/632; H04N 21/4788; H04N 21/25841; H04L 29/08351; H04L 29/08306; H04L 65/403
USPC ..................................................... 725/29, 97
See application file for complete search history.

(56) References Cited

U.S. PATENT DOCUMENTS

| | | |
|---|---|---|
| 7,317,791 B2 | 1/2008 | Carlson |
| 7,424,545 B2 | 9/2008 | Ducheneaut et al. |

(Continued)

*Primary Examiner* — Ricky Chin

(57) ABSTRACT

A system, method and computer readable media are disclosed for presenting a simultaneous multimedia experience to a plurality of computing devices, each at different locations. The method involves coordinating a simultaneous presentation of multimedia content to a plurality of computing devices, receiving a control signal from a computer of one of the plurality of computing devices to control the presentation of multimedia content, and broadcasting the control assigned to each of the plurality of computing devices such that a control event substantially simultaneously occurs in the presentation of a multimedia content at each of the plurality of computing devices. Where commercial breaks and length of presentation differences occur in various time zones or geographically disparate areas, the method may include utilizing synchronization points, adding new content in time gaps at a computing device and/or modifying the length of the presentation to maintain synchronization among the computing devices in a group.

20 Claims, 5 Drawing Sheets

(51) Int. Cl.
 *H04N 21/4788* (2011.01)
 *H04N 5/765* (2006.01)
 *H04H 60/27* (2008.01)

(56) References Cited

U.S. PATENT DOCUMENTS

| | | | |
|---|---|---|---|
| 7,620,659 | B2 | 11/2009 | Novik et al. |
| 7,669,219 | B2 | 2/2010 | Scott, III |
| 7,716,376 | B1 | 5/2010 | Price et al. |
| 2001/0044835 | A1 | 11/2001 | Schober et al. |
| 2004/0236832 | A1 | 11/2004 | Morris et al. |
| 2006/0242309 | A1 | 10/2006 | Damick et al. |
| 2007/0255788 | A1 | 11/2007 | Troung |
| 2007/0271338 | A1 | 11/2007 | Anschutz |
| 2008/0209021 | A1 | 8/2008 | Shamma |
| 2009/0019374 | A1 | 1/2009 | Logan et al. |
| 2009/0228911 | A1 | 9/2009 | Vrijsen |
| 2010/0138512 | A1 | 6/2010 | Morris et al. |

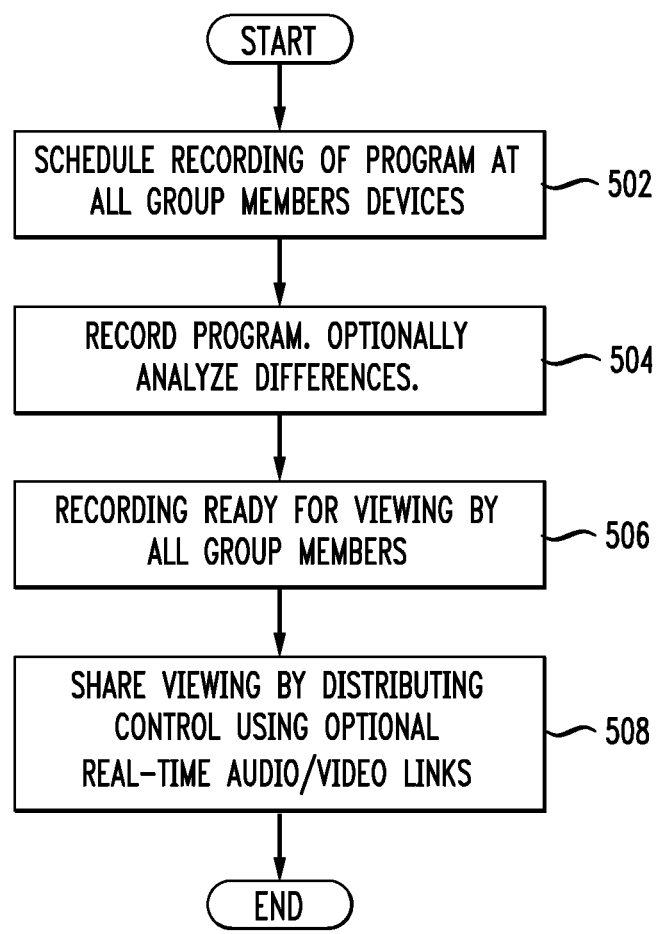

US 9,009,767 B2

PROCESS AND METHOD OF PROVIDING A SHARED EXPERIENCE WITH MULTIMEDIA CONTENT

PRIORITY

The present application is a continuation of U.S. patent application Ser. No. 11/685,509, filed Mar. 13, 2007, the content of which is incorporated herein by reference in its entirety.

BACKGROUND OF THE INVENTION

1. Field of the Invention

The present invention relates to multimedia content and more specifically to a system and method of providing a shared experience with multimedia content over a communication system.

2. Introduction

Many media devices such as VCRs, portable video recorders, cable set top boxes, CD players, DVD players and so forth, allow users to control the playback of multimedia content. For example, common control features include pause, slow motion, frame advance and repeat. Currently, these media devices are used as stand alone units, which limits their use to a small number of users at a single location. For example, many users will have a home theater in which a DVD player and a cable set top box are utilized at one location in which they can manipulate and manage their multimedia viewing. Often many users in their homes will have more than one television or cable set top box in different rooms and will desire, while in the middle of watching a multimedia selection, to move to another location. The current status of standalone multimedia units prevents an ease of use at multiple locations. In another scenario, there may be multiple people in multiple different locations, who each desire to watch the same multimedia presentation. There is a lack of ability which enables synchronization of these various presentations at the various locations. Accordingly, what is needed in the art is an improved system and method for enabling the sharing of multimedia content at different locations.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the limitations set forth above and provides a system and method which allows multiple users to co-watch content at multiple locations and further provides multimedia real time communications among the users which can provide a rich shared experience for business or home use. The invention includes systems, methods and computer-readable media for controlling one or more computing devices which can enable the shared experience of multimedia content between multiple users at different locations. An example method embodiment of the invention includes a method of controlling a shared experience of multimedia content comprising scheduling a recording of a multimedia event at all group member's devices, recording the multimedia event and optionally analyzing differences between group member's devices and/or locations, generating a recording of the multimedia event such that it is ready for viewing by all group members and providing a shared viewing experience by distributing control using optimal real time communication and/or audio-video links. The principles of the present invention may be utilized in many media devices, such as digital video recorders, TiVo devices, cable set-top boxes provided by cable companies and so forth. Other local exchange carriers are moving into the multimedia space beyond just voice services as well as other content management and search engine providers such as Google and Yahoo.

Where commercial breaks and length of presentation differences occur in various time zones or geographically disparate areas, the method may include utilizing synchronization points, adding new content in time gaps at a computing device and/or modifying the length of the presentation to maintain synchronization among the computing devices in a group. This is preferably achieved by segmenting the multimedia data at each location by segments that are common to all groups, segments that not all participants have and/or default or insertion segments to fill in gaps where necessary.

Another aspect of the invention involves receiving audio from a microphone associated with at least one of the plurality of computing devices and transmitting the audio to each of the plurality of computing devices for playback on at least one surround sound speaker associated with at least one of the plurality of computing devices. This feature enables spatial delineation between sound from the multimedia presentation and sound from other participants in the group.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
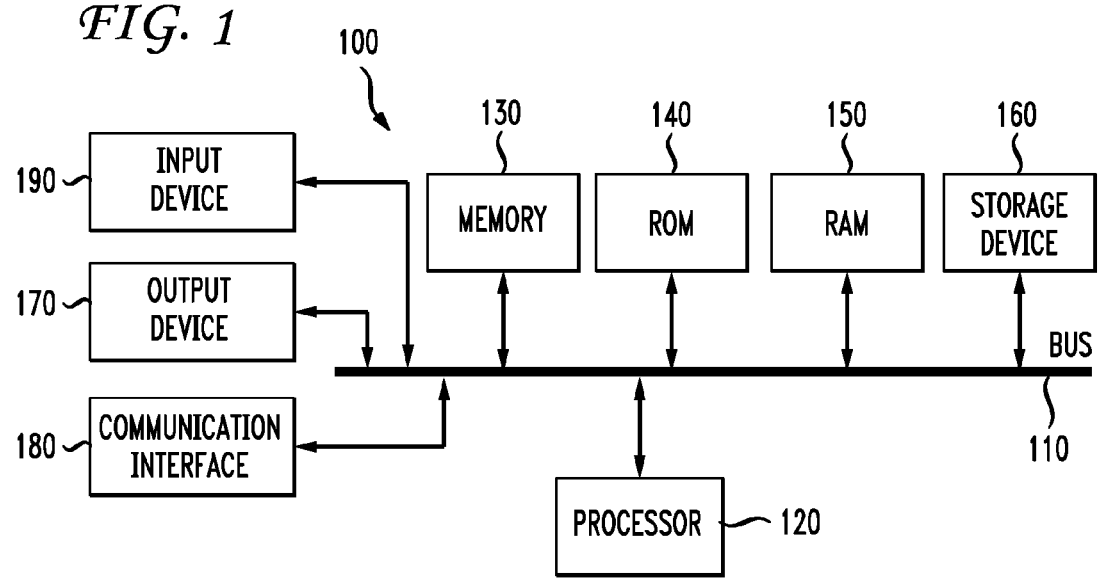
FIG. 1 illustrates a basic hardware configuration.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. Thus, the term "module" may refer to software controlling associated hardware or VSLI circuitry programmed to perform certain functions.

The various embodiments of the invention generally relate to providing a shared experience with multimedia content over a communications system. An aspect of the invention relates to providing multiple media players or recording devices that are linked in a data network. The control of the media by a user at one device is distributed to all other devices within the group and thus the media playing at each location can be synchronized. The devices are also capable of participating in a multimedia conference while playing media content.

Figure 2:
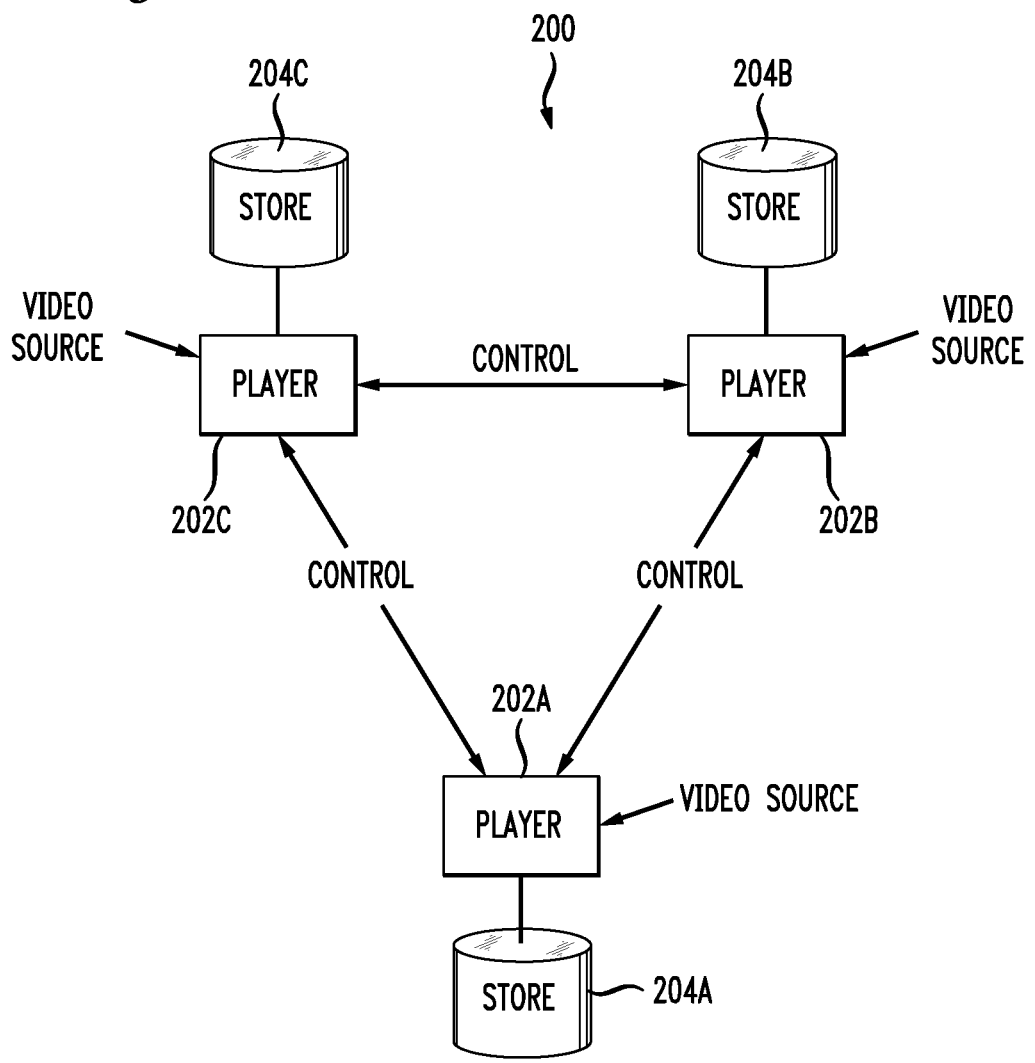
FIG. 2 illustrates a peer-to-peer embodiment.

FIG. 2 illustrates an embodiment of the invention in a peer-to-peer control context. In the network 200 shown in FIG. 2, players 202A, 202B and 202C are peer-to-peer computing devices such as multimedia players and recorders. These computing devices, wireless or not, are capable of peer-to-peer communication and multimedia display. Each device may receive video from a video source such as a DVD or over a network. Communication protocols and means are known to those of skill in the art for peer-to-peer control between these devices. Each respective player also includes a local media recording of storage device 204A, 204B, 204C. Each player 202A, 202B, 202C may also be a video source.

Figure 3:
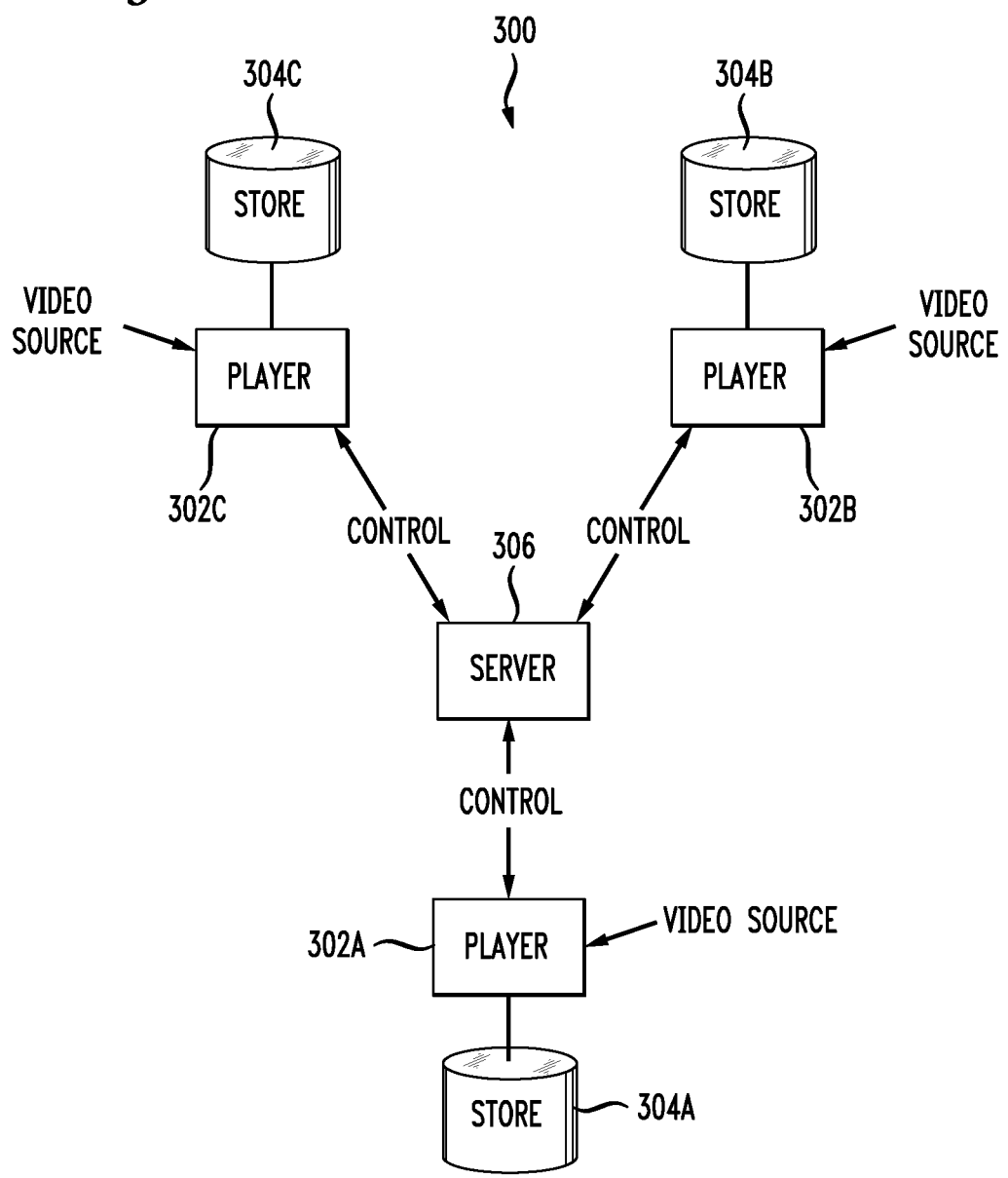
FIG. 3 illustrates a server-direct embodiment.

FIG. 3 illustrates a network 300 which provides more centralized control, wherein a server 306 communicates with media computing devices, such as multimedia players 302A, 302B, 302C which each have respective database local media recording and storage capability 304A, 304B, 304C. As is know in the art, there are a variety of standard protocols and communication means to communicate between the server 306 and various computing devices which may be generally termed as media devices or client devices.

Figure 4:
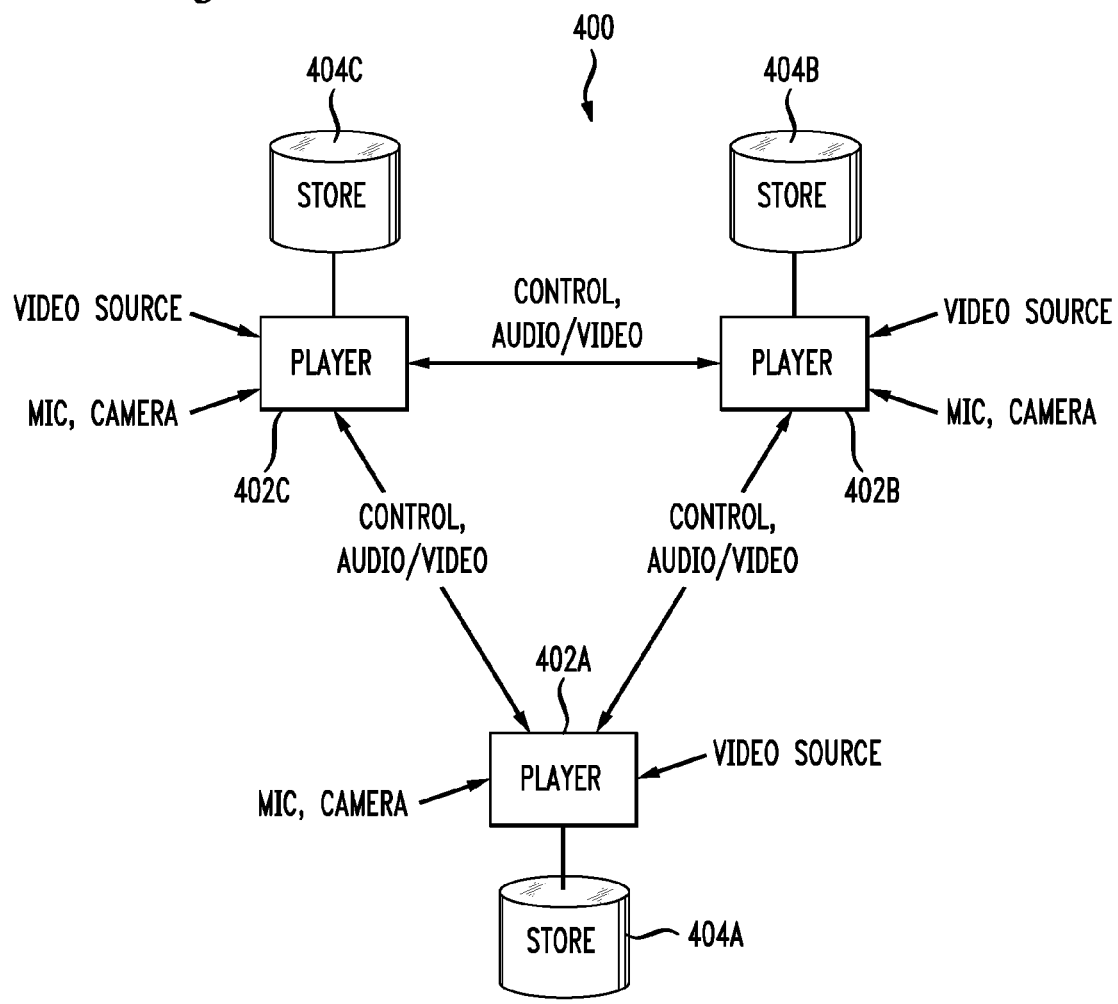
FIG. 4 illustrates a conferencing aspect of the invention.

FIG. 4 illustrates an aspect of the invention in which multimedia realtime communication is an additional feature associated with the peer-to-peer network. In this network 400, each computing device such as the multimedia players and recorders 402A, 402B, 402C, in addition to including a video source, also includes a microphone and a camera as input. FIG. 4 illustrates the control and audio video information or parameters associated with the audio and video information that are transmitted and communicated between each peer-to-peer computing device.

The concept disclosed herein links multiple computing devices in similar or different network types and provides user control from a single device that is then distributed to all devices such that the viewing of multimedia content is synchronized. Each computing device within the network of FIGS. 2-4 may be deemed a "group member device." In this regard, some or all of the computing devices within the network may be deemed as part of the group. For example, a subset of computing devices within the peer-to-peer and/or server/client context may be associated within a group. The control or ability to participate in the control of the multimedia presentation may be governed via group rights or participation.

There are many ways that the principles of the invention may be implemented, such as using digital video recorders linked in an IP wide area network. The control signal may be broadcast directly to all other devices in a peer-to-peer model or via the centralized server model of FIG. 3. Content control may be limited to one of the users in the network who may be termed a single host or a small number of users which may be termed co-hosts or all users in the group which may be termed democratic control.

The devices may also act as endpoints in a multiparty audio or audio-video conference. The conference audio may be mixed in with the multimedia presentation currently being watched. In this context, the video showing the parties watching the conference may be shown as a picture-in-picture image together with the presented multimedia content.

As an example, if there are three parties, each at their own location watching a multimedia presentation, each computing device in this location may have a camera that records and transmits the video of each respective party. The system presents in a corner or other location of the display of each of the parties one or more picture-in-picture windows wherein each window includes a realtime image of one of the respective parties that is watching the multimedia content. As shown in FIG. 4, each computing device may also have a microphone input wherein audio from each of the users may be presented in a synchronized way to each location and may be mixed with the audio of the multimedia presentation being watched.

In the case of content that is recorded from broadcast sources, the system may coordinate the recording at each device, taking into account time zone and scheduling differences. It can then schedule the earliest time when the shared experience session can take place. The system can then deploy analysis of the audio and video or both streams of information to detect any time shift due to variation of broadcast content by different providers to maintain synchronization. In other words, the control information shown in FIG. 4 may not only relate to pausing, playing, audio level or other parameters associated with the multimedia content, but may also take into consideration time differences, network bottlenecks, differences in commercial break lengths and timing, differences in program length and so forth, such that the presentation of the multimedia content at each location is properly adjusted such that the viewing is synchronized. A simple example of this may be if several users in the group are geographically located relatively close such as between Washington D.C. and Philadelphia, whereas the other viewer in the group is geographically at a distant location, such as Seoul, Korea. The system may modify, by either speeding up or slowing down, the timing of the presentation of multimedia content to the users such that they are all simultaneously viewing the content. The basic mechanisms for providing this control are known to those of skill in the art.

The content may be recorded from a broadcast source. The system can coordinate the recording at each device taking into account time zone and broadcast scheduling differences. Thus, as is shown in FIG. 4, the multimedia content may be stored in the respective local storage medium 404A, 404B, 404C. At the time of viewing, the system may deploy an analysis on the audio or video streams to detect the time shift due to variation of the broadcast content by the different providers and thus provide audio/video control parameters that maintain synchronization while the actual playback of the video may be performed from a local database. The system can also take responsibility of distributing content from a device to other devices in the shared experience session. For example, if the multimedia bandwidth is greater than the connection bandwidth then the distribution can start ahead of time such that playback will not be disrupted.

As another example of the synchronization that may occur, consider users at three different locations in which a prerecorded program was scheduled to play at 8:00 pm. However, if the three recording devices are in three different time zones, then the actual viewing of the program will occur at different times. Using the synchronization approach disclosed herein, a controlling system may instruct local recording devices to each record the scheduled program at a local time. Inasmuch as the program is stored, for example, locally on a digital video recorder, later when a synchronized viewing of the stored content is desired, the system may cause the multimedia playback to occur simultaneously, although the recording of the event occurred at disparate times. In this regard, an aspect of the invention involves performing an analysis on the broadcast program, the timing of the broadcast, the local scheduling according to members of the group, and so forth, such that the local recording of the broadcast content can be coordinated. Having synchronized the local recording of the content, the system can then control synchronized playback and control of the multimedia content with or without user controls disclosed herein.

As an example of when analysis of different broadcasts is desirable, assume that a broadcast event is recorded in two different time zones by two different content providers. In one time zone, a 2.5 minute commercial break occurs at 25 minutes into the program. In another time zone, a 3 minute commercial break occurs at 20 minutes. The analysis will include in this case finding the common audio/video content and the corresponding synchronization points. In a simple case, the synchronization of the media streams involves just time shifting the media rendering so that all the participants were watching the show simultaneously. If there were no commercial or other breaks in the multimedia presentation, then this simple aspect is accomplished (leaving aside the user remote control functions) by starting the multimedia streams simultaneously on the users' screens. However, the audio and/or video is preferably analyzed before the group watches the stream because of the possibility of different lengths of the commercial breaks embedded in the local recordings of the multimedia presentation. Based on the analysis, a simultaneous presentation of the recorded media event can occur at each location for members of the group.

Further, in some cases the overall length of the recorded program may also be different. For example, one time zone may cut out 30 seconds of the presentation in order to facilitate another commercial. The analysis of the different presentations may cause the system to also skip those 30 seconds when simultaneously presenting the multimedia event to the group or fill in those 30 seconds of time with alternate programming or a message to those members of the group who do not have those 30 seconds of time locally recorded. A commercial or advertising may be also sold and presented in this time gap or conferencing video may be inserted. Another aspect would be to transmit those 30 seconds from one local recording device in the one time zone to the other local recording device in advance of the simultaneous presentation such that all gaps are filled in for all members of the group.

Thus, where commercial breaks and length of presentation differences occur in various time zones or geographically disparate areas, the method may include utilizing synchronization points, adding new content in time gaps at a computing device and/or modifying the length of the presentation to maintain synchronization among the computing devices in a group.

One example of how the system manages synchronization is by segmenting each local recording into (1) segments that are common to all participants in the group and (2) unique segments that not everyone in the group has. With the segmentation, the system can then handle the various possible needs in multiple ways. For example, the system may concatenate all common segments to form a program common to all participants. Playback is then a shared experience and straightforward. The system may transfer the non-shared segments such that each local unit has all the segments and then concatenate them for a shared experience. Alternately, the system may have default segments (such as commercials or other data) that may be inserted from a central location or stored locally (and perhaps periodically updated) that are inserted where a local unit is missing units that are to be played on other devices.

FIG. 5 illustrates a method embodiment of the invention. The method comprises scheduling recording of a program at all group member's devices (502). This is especially applicable in the peer-to-peer context where local storage of content may occur. It is preferable in the present invention that the storage of the content be local for easier manipulation and adjustment of the multimedia presentation. However, the specific location of the database that stores multimedia content does not have to be local and it may be stored at a more centralized location which may be more applicable to the server/client context of FIG. 3. Next, the method comprises recording the program and optionally analyzing differences (504). The analysis may include, as discussed above, geographic location of users, time zone differences, bandwidth limitations, such that a realtime network analysis may occur in which predicted network conditions may be analyzed as well as realtime. For example, if the users have scheduled a time to view the multimedia contents simultaneously during a time when network traffic is traditionally at a maximum such that there may be delays between control parameters that may be provided by a host user, then appropriate adjustments can be made. Furthermore, realtime adjustments may be made and continually updated to insure synchronization of events. Next, the method comprises implementing the analysis such that recordings of the multimedia content may be ready by all group members (506) and finally the method comprises providing a shared viewing by distributing control using optimal realtime audio and video links.

Several exemplary implementations of the concept disclosed herein are provided. In a single host scenario, for example, it may be assumed that the user of computing device 402A is the single host in the context of FIG. 4. In this case, a multimedia program is locally stored in databases 404A, 404B, 404C. The system synchronizes the presentation of the multimedia content on each player device 402A, 402B, 402C such that each group member is simultaneously viewing the information. The microphone and camera at each player device may in realtime receive audio and video information. For example, in the context of a conference call, while also simultaneously viewing media content, an aspect of the invention also provides that computing device 402A will also receive content control information from the host user. This may include, for example, each group member being able to view a movie and simultaneously see a picture-in-picture image of each participant in the video conference, as well as being able to share audio with one another. If, in the midst of viewing the media content, a single user desires to pause the media presentation, then the user presses a pause button on a control mechanism at computing device 402A. Control information immediately is transmitted through the peer-to-peer network or through a server/client network to the other computing devices such that the local systems pause the media presentation from local databases 404B, 404C. Other media control such as slow motion, repeating, fast forwarding, scanning, chapter selection, scene selection and so forth would also be communicated from the single host to the other computing devices. In other words, the principles of the invention enable viewers in different locations to simultaneously see the multimedia presentation as though in the same manner as the host user views the multimedia presentation as it is controlled by the host user.

Also referenced above is the opportunity for a number of users to be co-hosts. In this context, in addition to the user of computing device 402A, for example, the user of computing device 402B may also be a host controller. In this regard, each of these users may have a remote control and whenever one of these users were to press a control button such that the viewing of the multimedia presentation would be altered by way of pausing slow motion and so forth, then the control from each of these users would cause the system to create a control signal that is sent to the other peer-to-peer or server/client computing devices such that the change is simultaneously viewed by the other users. There may be priorities of co-hosts such that a senior co-host's control signals may take priority over other co-hosts or there may be other types of negotiated selections of which control signals to implement in the case of conflicts.

In the context of democratic control, each user may be given host authority such that control selections may be implemented to all other group members in the group. There may be a number of optional features in which the system will determine what actions to take. For example, if there are ten group members and, under democratic control, six members decide to pause the multimedia program whereas a minority of members selects fast forward, the multimedia program, then under democratic control, may operate to analyze the various input from the various members such that the control feature selected by a majority of the group members may be implemented.

Other control analysis and options may be implemented as well. For example, over time each member may be granted more authority or be able to gain or lose their authority in the context of who gets to control the presentation of the multimedia program. For example, users may gain more authority the longer they are a part of the group. Thus, a user that has been in the group for two years when they implement a control of the multimedia program they may have their input count for ten points where new users may have their input count for one point and thus the system may analyze the various user input and implement the input that gains more than 5 points which may be the input of six users or it may be the input of 70 first year users such that the appropriate threshold is passed and the particular input is implemented in a synchronized manner to each group member.

Also as introduced above, in addition to providing a simultaneous control of the presentation of multimedia content may also be used in the context of an audio/video conference. For example, if the group members are each watching a movie and the computing devices also have a microphone and camera connected to them, each user may be able to provide audio or commentary on the multimedia presentation and the audio may be mixed with the audio of the content being watched. Furthermore, the audio that is spoken by users at the various computing devices, in addition to being mixed, may also be assigned a particular channel. For example, in a conference room or in a home theater there may be a 7.1 audio system with one sub-woofer and surround sound speakers and the audio from various players may be assigned to one or more of the speakers such that that audio comes from behind or from the side of the user rather than from the front. For example, a virtual geographic configuration may be presented such that, for example, using FIG. 4, the group member associated with computing device 402B may speak and the sound from that user may be transmitted into the channel such that it comes out of the speaker on the right side of the 7.1 sound system. Similarly, the group member associated with player 402A may have his or her audio come from the rear speakers in the surround sound system and the sound from speaker 402C may be channeled to the left side speaker of the surround sound system such that the front speakers of the audio system primarily are used for the audio of the multimedia content. The surround sound channels may then be used for spatial delineation of audio from other participants from the audio tracks from the multimedia content. Similarly in an audio/video context the camera associated with each computing device may transmit the video associated with each respective group member to the other group members in a picture-in-picture context such that each user is able to simultaneously view the multimedia content while also simultaneously being able to view each other in the video conference.

Appropriate adjustments may be made to the quality of such transmitted video inasmuch as, in the preferred embodiment, the multimedia presentation is stored locally rather than transmitted over a possibly bandwidth limited network. The picture-in-picture information, as part of video conference, will in realtime be transmitted over a network to the other users within the group. Accordingly, in addition to modifying the video conferencing information that is transmitted over a network to other members of the group, an analysis may be performed of that content and appropriate adjustments may be made to the multimedia presentation such that synchronization of both the multimedia presentation and the video conferencing information as well as the audio conferencing information may be maintained.

Also as noted above, in the server/client context there may be other adjustments that may be made to maintain synchronization. For example, if the system determines that the media bandwidth may have problems in enabling synchronized viewing of multimedia content, the system that is responsible for distributing content from a device such as a server or from one device to another in a shared experience session may begin distribution in advance in scenarios such as where the media bandwidth is greater than the connection bandwidth. The difference in the bandwidth of a multimedia connection may also vary from user to user and thus a network analysis associated with each individual user may be performed such that distribution may begin ahead of time or at varying intervals on a per user basis.

A service provider of the invention disclosed herein may also a variable fee scheme such that an additional subscription fee or per use fee may be implemented for the capability of controlling of the synchronization of a multimedia presentation and/or audio/video conferencing feature as disclosed herein. For example, in one aspect of the invention, a particular user may be able to increase their control in, for example, a democratic control context by paying more money to enable their control choices to have more impact in the context of control decisions of other users.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the principles disclosed herein are applicable to any networked set of computing devices. Thus, the invention may apply to such arrangements as Internet gaming. Accordingly, the appended claims and their legal equivalents should only define the invention, rather than any specific examples given.

We claim:

1. A method comprising:
    receiving, from a plurality of computing devices located at disparate geographic locations, information associated with a presentation of multimedia content;
    synchronizing the presentation of the multimedia content across the disparate geographic locations, to yield synchronized multimedia content;
    receiving control signal votes from a plurality of viewers, the plurality of viewers associated with the plurality of computing devices, wherein each control signal vote in the control signal votes is associated with a viewer in the plurality of viewers, and wherein each control signal vote has a weight which increases based on an amount of time the viewer associated with the each control signal vote has been in the plurality of viewers;
    determining a control signal using the control signal votes to control presentation of the synchronized multimedia content; and
    communicating the control signal to each of the plurality of computing devices such that the synchronized multimedia content is presented in a synchronized form at each of the plurality of computing devices per the control signal.

2. The method of claim 1, wherein the synchronizing of the presentation comprises identifying common synchronization points in the multimedia content.

3. The method of claim 2, wherein the plurality of computing devices communicate via one of: a peer-to-peer network, an internet protocol wide area network, a local area network, a wireless network, and a server-client network.

4. The method of claim 3, further comprising:
receiving audio from a microphone associated with one of the plurality of computing devices; and
transmitting the audio to each of the plurality of computing devices for playback on a speaker associated with the plurality of computing devices.

5. The method of claim 1, wherein the weight of each control signal vote is further based on one of: a payment by the viewer, a title of the viewer, a period of time, a type of control signal, the viewer's history of broadcasting control signals, a geographic location of the viewer, and a language spoken by the viewer.

6. The method of claim 1, wherein the multimedia content comprises pre-recorded content.

7. The method of claim 6, further comprising communicating live media content from a location of one of the plurality of computing devices to each of the plurality of computing devices.

8. The method of claim 7, wherein the live media content is presented as a picture-in-picture of the pre-recorded content.

9. A system comprising:
a processor; and
a computer-readable storage medium having instructions stored which, when executed by the processor, cause the processor to perform operations comprising:
receiving, from a plurality of computing devices located at disparate geographic locations, information associated with a presentation of multimedia content;
synchronizing the presentation of the multimedia content across the disparate geographic locations, to yield synchronized multimedia content;
receiving control signal votes from a plurality of viewers, the plurality of viewers associated with the plurality of computing devices, wherein each control signal vote in the control signal votes is associated with a viewer in the plurality of viewers, and wherein each control signal vote has a weight which increases based on an amount of time the viewer associated with the each control signal vote has been in the plurality of viewers;
determining a control signal using the control signal votes to control presentation of the synchronized multimedia content; and
communicating the control signal to each of the plurality of computing devices such that the synchronized multimedia content is presented in a synchronized form at each of the plurality of computing devices per the control signal.

10. The system of claim 9, wherein the synchronizing of the presentation comprises identifying common synchronization points in the multimedia content.

11. The system of claim 10, wherein the plurality of computing devices communicate via one of: a peer-to-peer network, an internet protocol wide area network, a local area network, a wireless network, and a server-client network.

12. The system of claim 11, the computer-readable storage medium having additional instructions stored which, when executed by the processor, result in operations comprising:
receiving audio from a microphone associated with one of the plurality of computing devices; and
transmitting the audio to each of the plurality of computing devices for playback on a speaker associated with the plurality of computing devices.

13. The system of claim 9, wherein the weight of each control signal vote is further based on one of: a payment by the viewer, a title of the viewer, a period of time, a type of control signal, the viewer's history of broadcasting control signals, a geographic location of the viewer, and a language spoken by the viewer.

14. The system of claim 9, wherein the multimedia content comprises pre-recorded content.

15. The system of claim 14, the computer-readable storage medium having additional instructions stored which, when executed by the processor, result in operations comprising communicating live media content from a location of one of the plurality of computing devices to each of the plurality of computing devices.

16. The system of claim 15, wherein the live media content is presented as a picture-in-picture of the pre-recorded content.

17. A computer-readable storage device having instructions stored which, when executed by a computing device, cause the computing device to perform operations comprising:
receiving, from a plurality of computing devices located at disparate geographic locations, information associated with a presentation of multimedia content;
synchronizing the presentation of the multimedia content across the disparate geographic locations, to yield synchronized multimedia content;
receiving control signal votes from a plurality of viewers, the plurality of viewers associated with the plurality of computing devices, wherein each control signal vote in the control signal votes is associated with a viewer in the plurality of viewers, and wherein each control signal vote has a weight which increases based on an amount of time the viewer associated with the each control signal vote has been in the plurality of viewers;
determining a control signal using the control signal votes to control presentation of the synchronized multimedia content; and
communicating the control signal to each of the plurality of computing devices such that the synchronized multimedia content is presented in a synchronized form at each of the plurality of computing devices per the control signal.

18. The computer-readable storage device of claim 17, wherein the synchronizing of the presentation comprises identifying common synchronization points in the multimedia content.

19. The computer-readable storage device of claim 18, wherein the plurality of computing devices communicate via one of: a peer-to-peer network, an internet protocol wide area network, a local area network, a wireless network, and a server-client network.

20. The computer-readable storage device of claim 19, having additional instructions stored which, when executed by the computing device, result in operations comprising:
receiving audio from a microphone associated with one of the plurality of computing devices; and
transmitting the audio to each of the plurality of computing devices for playback on a speaker associated with the plurality of computing devices.

* * * * *